United States Patent [19]

Williams

[11] 4,215,185

[45] Jul. 29, 1980

[54] LIQUID JUNCTION SCHOTTKY BARRIER SOLAR CELL

[75] Inventor: Richard Williams, Princeton, N.J.

[73] Assignee: RCA Corporation, New York, N.Y.

[21] Appl. No.: 24,065

[22] Filed: Mar. 26, 1979

[51] Int. Cl.² .......................................... H01L 31/06
[52] U.S. Cl. .............................. 429/111; 136/89 SJ; 357/15; 357/30
[58] Field of Search ................... 429/111; 136/89 SJ; 357/15, 30

[56] References Cited

U.S. PATENT DOCUMENTS

| | | | |
|---|---|---|---|
| 3,900,945 | 8/1975 | Kay et al. | 29/572 |
| 4,084,044 | 4/1978 | Heller et al. | 429/111 |
| 4,118,548 | 10/1978 | Chang et al. | 429/111 |
| 4,127,449 | 11/1978 | Heller et al. | 204/2.1 |

OTHER PUBLICATIONS

R. Memming, "The Role of Energy Levels in Semiconductor-Electrolyte Solar Cells", *J. Electrochem. Soc.*, vol. 125, pp. 117-123 (1978).
R. E. Schwerzel et al. "Optimal Electrode Properties and the Selection of Stabilizing Electrolytes", *Semiconductor Liquid Junction Solar Cells*, Electrochemical Society Proceedings vol. 77-3 (1977), pp. 293-314.
R. Williams, "Electrochemical Reactions of Semiconductors", *J. Vac. Sci. Technol.* vol. 13, pp. 12-18 (1976).
R. Williams, "Chemistry & Electrical Properties of Interface Between ZnSe and an Electrolyte", *J. Electrochem. Soc.*, vol. 114, pp. 1173-1179 (1967).
H. Gerischer et al., "Das Korrosions Des Germaniums und Seine Abhängigkert Von Der Dotierung, Der Korrosionsgeschwindigkeit und der Belichtung", *Zeit. fur Physik. Chem.*, Neue Folge, vol. 23, pp. 113-132 (1960).

*Primary Examiner*—Aaron Weisstuch
*Attorney, Agent, or Firm*—Birgit E. Morris; A. Stephen Zavell

[57] ABSTRACT

A mixture of ceric ions ($Ce^{+4}$) and cerous ions ($Ce^{+3}$) in an aqueous electrolyte solution forms a Schottky barrier at the interface between an active region of silicon and the electrolyte solution. The barrier height obtained for hydrogenated amorphous silicon using the $Ce^{+4}/Ce^{+3}$ redox couple is about 1.7 eV.

9 Claims, 1 Drawing Figure

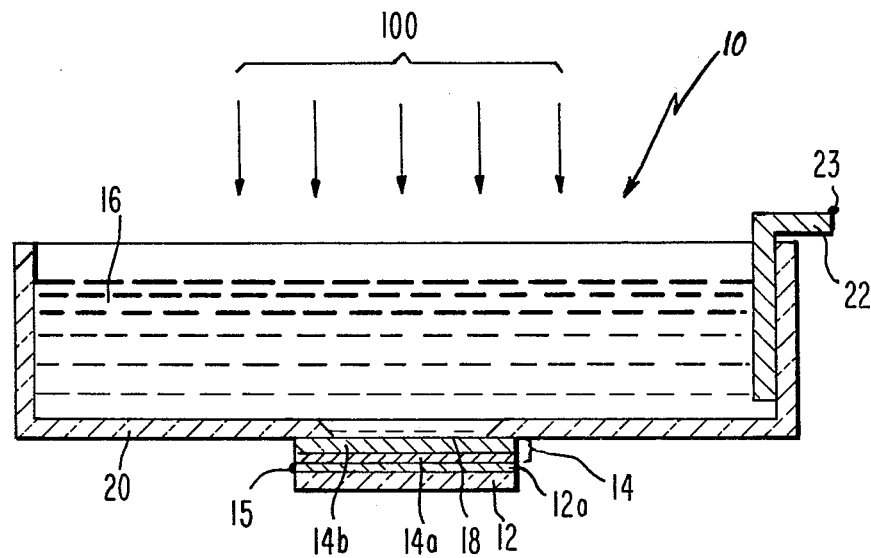

LIQUID JUNCTION SCHOTTKY BARRIER SOLAR CELL

The invention described herein was made during the performance of work under a Department of Energy Contract EY-76-C-03-1286.

The present invention relates to solar cells. More particularly, the invention relates to liquid junction Schottky barrier solar cells.

BACKGROUND OF THE INVENTION

Photovoltaic devices are capable of converting solar radiation into usable electrical energy. The energy conversion occurs as a result of what is well-known in the solar cell field as the photovoltaic effect. Solar radiation impinging on a solar cell and absorbed by a semiconductor body, such as hydrogenated amorphous silicon, generates electrons and holes. The electrons and holes are separated by a built-in electric field, for example, by a rectifying junction such as a Schottky barrier, in the solar cell. The electrons generated at the interface of the Schottky barrier material and an N-type semiconductor body flow toward the semiconductor body where said electrons are collected. The separation of electrons and holes results in the generation of an electrical current known as the photocurrent.

The photovoltage or open circuit voltage of the solar cell is dependent, inter alia, upon the height of the barrier between the semiconductor body and the Schottky barrier material. C. R. Wronski et al, Solid State Communications 23, 421 (1977), have reported barrier heights of up to about 1.1 eV with high work function metals such as platinum contacting intrinsic hydrogenated amorphous silicon. Although the energy gap of hydrogenated amorphous silicon varies with the concentration of hydrogen up to the bandgap energy of about 1.7 eV, the value of the open circuit voltage of the solar cell is dependent upon the barrier height of the Schottky barrier material. Thus, to maximize the open circuit voltage of a solar cell, it would be highly desirable to have a material wherein the barrier height between the material and the semiconductor body is approximately as large as the bandgap energy of the semiconductor.

SUMMARY OF THE INVENTION

A Schottky barrier material, which comprises a mixture of ceric and cerous ions in an electrolyte solution, contacts an N-type semiconductor material of a liquid junction Schottky barrier solar cell. A Schottky barrier, which forms at the interface between the hydrogenated amorphous silicon and the solution, exhibits a barrier height of up to about 1.7 eV. A method of increasing the Schottky barrier height in an amorphous silicon solar cell comprises contacting a body of hydrogenated amorphous silicon with the redox couple of ceric and cerous ions in an electrolyte solution.

BRIEF DESCRIPTION OF THE DRAWING

The FIGURE illustrates a ceric-cerous ion Schottky barrier hydrogenated amorphous silicon solar cell.

DETAILED DESCRIPTION OF THE INVENTION

The invention will be more clearly illustrated by referring to the FIGURE which illustrates a liquid junction Schottky barrier hydrogenated amorphous silicon solar cell designated as 10, hereinafter solar cell 10. Solar radiation 100, impinging upon solar cell 10, provides a reference point for the incident surface of the electrolyte solution or each layer of the solar cell. Solar cell 10 includes a substrate 12 of material having good electrical conductivity properties and the ability to make an ohmic contact to the body of hydrogenated amorphous silicon 14. Examples of suitable materials are metals such as aluminum, stainless steel, molybdenum, titanium, and the like. If the substrate 12 is an insulator, such as soda-lime glass, glass, sapphire, and like materials, then a layer 12a of a transparent conductive oxide, such as $TiO_2$, $SnO_2$, chromium, and like materials, is deposited on substrate 12 to render it electrically conductive.

A body 14 of hydrogenated amorphous silicon, having regions of differing conductivity type, illustrated by 14a and 14b is fabricated by a glow discharge as taught in U.S. Pat. Nos. 4,064,521 and 4,142,195, and incorporated herein by reference, or application Ser. No. 727,659, filed Sept. 29, 1976, and incorporated herein by reference. Region 14a is doped $N^+$-type with suitable N-type conductivity modifiers such as phosphorus, arsenic, antimony, bismuth, cesium, sodium, and like materials. The $N^+$-type region 14a assures an ohmic contact to the electrically conductive substrate 12 or the combination of substrate 12 and 12a. Region 14a may have a thickness of up to about 1,000 nanometers. Preferably, thicknesses on the order of from about 10 to about 50 nanometers are chosen. Overlying region 14a is a region 14b of intrinsic hydrogenated amorphous silicon with a thickness of from about 200 to about 1,000 nanometers, and preferably about 400 nanometers. Intrinsic hydrogenated amorphous silicon, fabricated by a glow discharge in silane without conductivity modifiers incorporated in the deposition system, is slightly N-type. The body 14 is not limited to hydrogenated amorphous silicon. Body 14 can be fabricated from single crystal silicon, polycrystalline silicon, or gallium arsenide.

The substrate 12 and the body 14 are attached to a container 20 with an opening contained therein so that an electrolyte solution 16 can contact the body 14 of hydrogenated amorphous silicon and form a Schottky barrier at the interface 18 of the electrolyte solution 16 and the body 14. An electrode 22 of platinum, or other suitable material, is used to contact the electrolyte solution 16. Wires 15 contacting the substrate 12 and wire 23 contacting the electrode 22 withdraw the current generated during the operation of the cell.

The electrolyte solution 16 contains both ceric ions ($Ce^{+4}$) and cerous ions ($Ce^{+3}$). Preferably, ceric and cerous ions are present in equal molar concentrations. The molar concentrations can vary over the range of from about 0.005 to about 0.5 molar concentrations of each species. The electrolyte solution is created by dissolving compounds such as $Ce_2(SO_4)_3$, $Ce(SO_4)_2 \cdot 2H_2SO_4$, $CeCl_3 \cdot 7H_2O$, $Ce(NH_4)_2(SO_4)_3$, and like materials in water, or other suitable aqueous or non-aqueous solvents, with sufficient additional $H_2SO_4$ to create the electrolyte solution. The pH of the solution should be adjusted to a pH of less than about pH 2 to minimize or preclude the formation of insoluble cerium compounds. An example of a suitable nonaqueous solvent is propylene carbonate or like materials. An example of a suitable electrolyte solution 16 would be an aqueous solution which comprises 0.05 molar ceric ions, 0.05 molar cerous ions, and 0.85 molar $H_2SO_4$.

Surface oxides which build up on the body 14 of hydrogenated amorphous silicon during the fabrication process or during operation of the solar cell tend to degrade or destroy the device performance. Surface oxides can be removed from the hydrogenated amorphous silicon by etching the silicon in a buffered solution of hydrofluoric acid, or other suitable etchant, for about 5 minutes.

Liquid junction solar cells fabricated in accordance with the previous description exhibit open circuit voltages, $V_{oc}$, of from about 1.15 to about 1.25 volts, in comparison to values reported by Wronski et al, Solid State Communications 23, 421 (1977), of about 0.8 volt for platinum Schottky barrier solar cells. The barrier height of the cerium ion couple can be estimated from the open circuit voltage of the cerium ion couple and the experimentally determined barrier height measured in the dark for a platinum Schottky barrier amorphous silicon solar cell. The barrier height of the cerium ion couple approaches the energy gap of the hydrogenated amorphous silicon material or about 1.7 eV.

The invention will be further illustrated by the following example, but it is to be understood that the invention is not meant to be limited solely to the details described therein. Modifications which would be obvious to one of ordinary skill in the solar cell or liquid junction solar cell art are contemplated to be within the scope of the invention.

EXAMPLE A

A Schottky barrier electrolyte solution was made by dissolving 1.46 grams of $Ce_2(SO_4)_3$ and 2.64 grams of $Ce(SO_4)_2 \cdot 2H_2SO_4$ in 100 milliliters of water having about a 0.75 molar concentration of $H_2SO_4$. The solution had a concentration of ceric and cerous ions of about 0.05 molar. The final concentration of sulphuric acid derived from the initial aqueous sulphuric acid solution and the dissolution of the ceric and cerous salts was about 0.85 molar $H_2SO_4$. The solution was placed in a structure illustrated in the FIGURE and illuminated with light of intensity equivalent to one sun. The solar cell had an open circuit voltage, $V_{oc}$, of about 1.23 volts, an initial short circuit current of 1.0 mA/cm$^2$ and a Schottky barrier height of about 1.7 eV.

I claim:

1. In a liquid junction Schottky barrier solar cell including an electrically conductive substrate and a semiconductor body of hydrogenated amorphous silicon having opposed major surfaces with a first major surface contacting said electrically conductive substrate and a second major surface contacting a liquid Schottky barrier material, the improvement which comprises employing as the Schottky barrier material an electrolyte solution comprising ceric and cerous ions.

2. The solar cell according to claim 1 wherein said ceric and cerous ions are present in concentrations from about 0.005 molar to about 0.5 molar.

3. The solar cell according to claim 2 wherein the pH of the electrolyte solution is below pH 2.

4. The solar cell according to claim 3 wherein the semiconductor body is hydrogenated amorphous silicon.

5. A liquid junction amorphous silicon solar cell comprising:
an electrically conductive substrate;
a body of hydrogenated amorphous silicon having regions of differing dopant concentrations, including a region of hydrogenated amorphous silicon of N+-type conductivity that electrically contacts said substrate, and a region of intrinsic hydrogenated amorphous silicon;
an electrolyte solution comprising the redox couple of ceric and cerous ions contacting said region of intrinsic hydrogenated amorphous silicon; and
means for electrically contacting said electrolyte solution.

6. The solar cell according to claim 5 wherein said electrolyte solution has a ceric ion concentration of from about 0.005 molar to about 0.5 molar and a cerous ion concentration of from about 0.005 to about 0.5 molar.

7. The solar cell according to claim 6 wherein the electrolyte solution has a pH below about pH 2.

8. The solar cell according to claim 7 wherein the ceric and cerous ion concentrations are achieved by dissolving in an electrolyte solution at least one ceric and at least one cerous ion compound selected from the group consisting of $Ce_2(SO_4)_3$, $Ce(SO_4)_2 \cdot 2H_2SO_4$, $CeCl_3 \cdot 7H_2O$, and $Ce(NH_4)_2(SO_4)_3$.

9. A method of increasing the open circuit voltage of a liquid junction Schottky barrier hydrogenated amorphous silicon solar cell comprising contacting said hydrogenated amorphous silicon with a Schottky barrier-forming solution comprising ceric and cerous ions dissolved in an electrolyte, wherein said ceric and cerous ions are present in a concentration of from about 0.005 to about 0.5 molar.

* * * * *